May 31, 1932.  H. L. HOOVER  1,861,394
GEAR SHIFTING LEVER
Filed Sept. 23, 1931   2 Sheets-Sheet 1

Inventor
Howard L. Hoover
By Clarence A O'Brien
Attorney

Patented May 31, 1932

1,861,394

UNITED STATES PATENT OFFICE

HOWARD LAVIER HOOVER, OF BATTLE CREEK, MICHIGAN

GEAR SHIFTING LEVER

Application filed September 23, 1931. Serial No. 564,680.

This invention relates to an improved gear-shifting lever for use in association with the transmission gearing employed in present-day automobiles and motor vehicles in general.

The purpose of the invention is to incorporate a novel accelerator in the handgripping head or ball on the upper end of the lever, the accelerator constituting an auxiliary fuel control for the conventional carbureter.

It is a matter of common knowledge that in present day transmission gear structures, rearward drifting of the car is frequently permitted. For example, while holding the car on an incline or steep grade with the foot brake, the car is apt to drift backward while exchanging the position of the foot from the brake with the customary foot accelerator. Skillful drivers are sometimes able to avoid this by flipping the clutch or using the hand-actuated parking brake in conjunction with the foot accelerator instead of holding the foot on the foot brake.

Being aware of these conditions, I have decided to embody a novel fuel control and accelerator mechanism in the complete construction of the gear shifting lever so that it may be simultaneously utilized for shifting the gears and feeding the gas to promote safety and to provide for more effective control of the car against retrograde drifting.

The specific structure and arrangement selected for accomplishing the desired result will become more readily apparent from the following description and drawings.

Figures 1, 2:
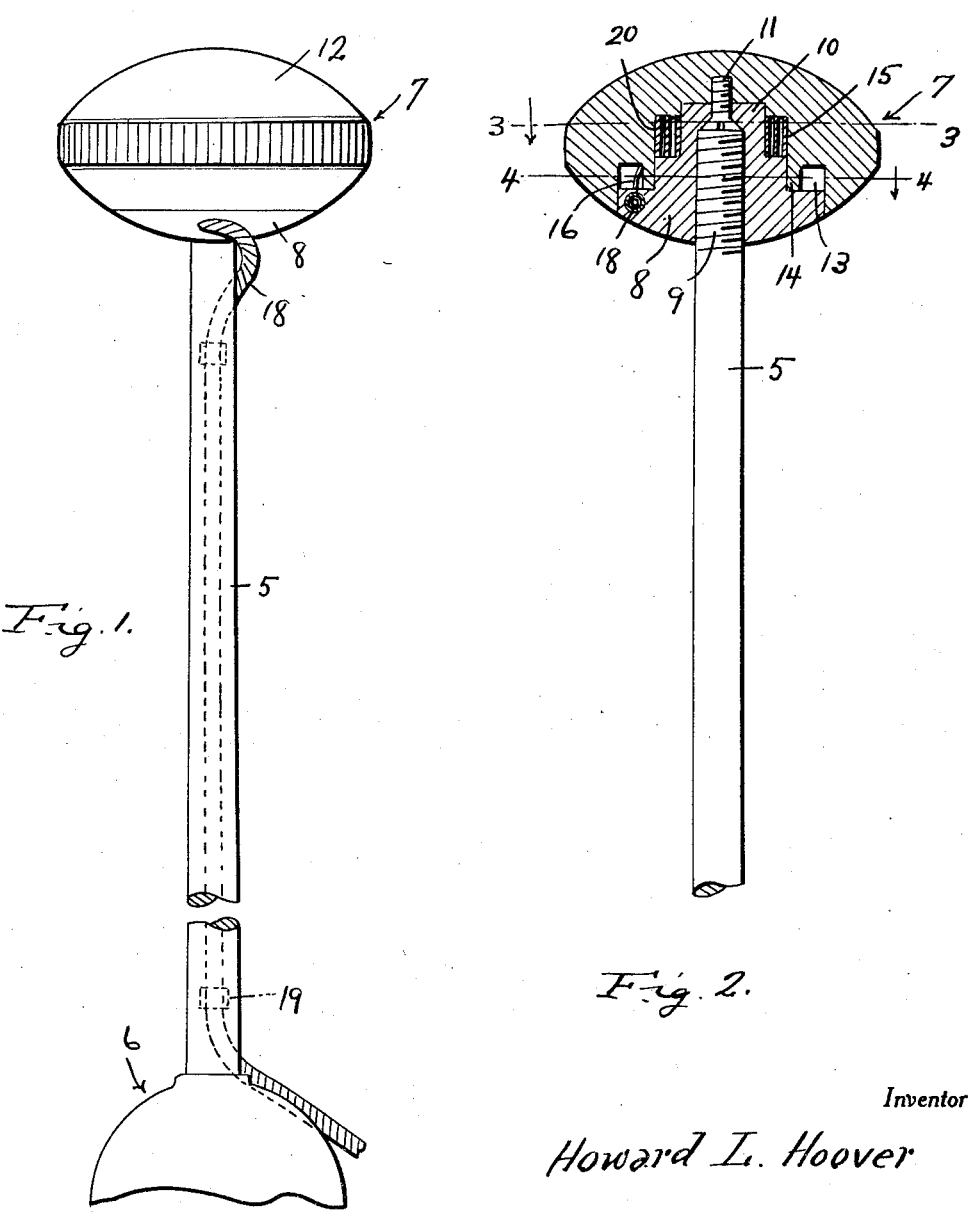
Figure 1 is an elevational view of the improved gear shift lever as constructed in accordance with the present invention.
Figure 2 is a view in section and elevation disclosing the most satisfactory arrangement discovered by me.

In Figure 1, the numeral 5 designates the customary rod of the conventional gear shifting lever, this being mounted in the customary universal joint 6. The ball-like head 7 on the upper end thereof possesses a well-known form and configuration. Specifically, however, this part is of a decidedly different construction. In fact, as seen in Figure 2, it is made up of a stationary lower section 8 having a screw-threaded socket receiving the upper threaded end 9 of the rod 5. The marginal edge portions of this part 8 are of stepped formation and the upper end portion 10 is apertured to accommodate a connecting screw 11 which serves to join the relatively movable sections 12 to the stationary section 8. In fact, the part 12 is recessed or socketed to accommodate the part 8 so that they have interfitting telescopic relationship, the part 12 being rotatable about the part 8 and allowing said part 8 to serve as a sort of trunnion therefor.

Figure 4:
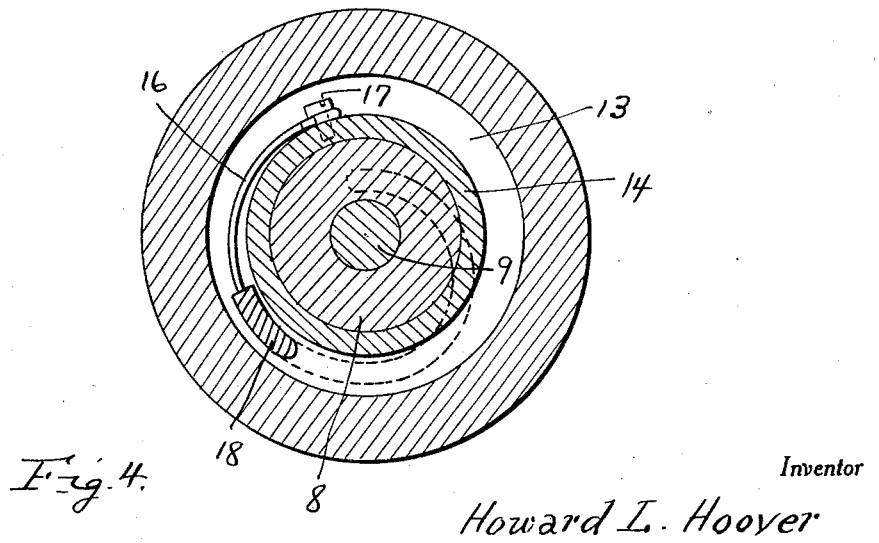
Figure 4 is a similar section on the line 4—4 of Figure 2.

The section 12 is grooved as at 13 and this grooved portion surrounds the marginal edge of the lowermost portion of the section 8. Then there is a flange 14 which surrounds the intermediate stepped portion and an additional groove and socket 15 co-operating with the uppermost portion 10. The groove 13 serves to accommodate the actuating wire or cable 16, the cable being fastened by an anchoring screw 17 to the flange 14, as seen in Figure 4.

This cable 16 extends down through a flexible casing 18 which in turn extends through an opening in the section 8 and is fastened by brackets or the like 19 along the rod 5. Obviously, the cable 16 extends down through the carbureter control mechanism (not shown) the same as the ordinary foot accelerator control wire.

Figure 3:
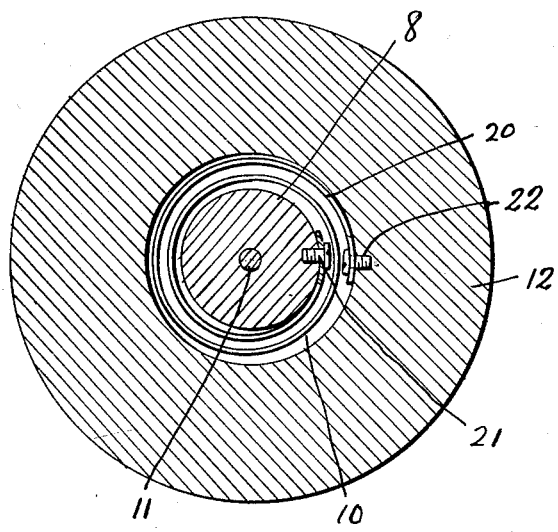
Figure 3 is a horizontal section on the line 3—3 of Fig. 2.

The aforesaid groove 15 co-operating with the uppermost reduced portion 10 of the section 8 provides a space which accommodates a flat coiled spring 20 which is fastened at opposite ends to the sections 8 and 12 respectively. For example, as seen in Figure 3, there is a screw 21 which attaches the inner convolution or coil of the spring to the stationary section 8 while a similar screw 22 constitutes a connection for anchoring the free end of the outermost convolution to the wall of the groove 15 in the part 12. Consequently the spring serves to normally maintain the part 12 in an ineffective state and to return it to said normal state after it is released by hand.

With the foregoing arrangement it is obvious that the accelerator on the gear shifting lever can be operated at the same time the lever is utilized for shifting the gears. By simply grasping the part 12 and rotating it against the tension of the spring, this serves to exert an endwise pull on the cable 16 and as this part 16 is connected with the control mechanism of the carbureter (not shown), the customary fuel acceleration action is produced.

This supplemental accelerator does not interfere with the gear shifting operation, and can be so timed as to allow the driver to release the foot brake gradually while feeding the gas and shifting the gears, whereby to permit the requisite gradual engagement of the clutch and to thereby avoid drifting of the car backward on inclinations.

It is thought from the foregoing description that the advantages and novel features of the invention will be readily apparent. It is to be understood that changes may be made in the construction and in the combination and arrangement of the several parts, provided that such changes fall within the scope of the appended claims.

I claim:

1. An auxiliary control for hand levers comprising a knob structure, said knob structure being divided into a pair of sections, one of said sections being attached to the hand lever, a connection between the other knob section and the hand lever whereby the last-mentioned section can rotate, a drum-like annular formation on the rotary section, a conduit passing through the first-mentioned section on the lever, a control rod extending through the conduit and having one end attached to the said drum-like extension.

2. An auxiliary control for hand levers comprising a knob structure, said knob structure being divided into a pair of sections, one of said sections being attached to the hand lever, a connection between the other knob section and the hand lever whereby the last-mentioned section can rotate, a drum-like annular formation on the rotary section, a conduit passing through the first-mentioned section on the lever, a control rod extending through the conduit and having one end attached to the said drum-like extension, said first-mentioned section being provided with a reduced extension, said rotary section being provided with a pocket for receiving the extension, said drum-like structure consisting of an annular flange for engagement with the extension on the first-mentioned section and against the outer side of which the control cable can be wound.

In testimony whereof I affix my signature.

HOWARD LAVIER HOOVER.